(12) United States Patent
Chen et al.

(10) Patent No.: US 7,035,238 B1
(45) Date of Patent: Apr. 25, 2006

(54) CODE ASSIGNMENT IN A CDMA WIRELESS SYSTEM

(75) Inventors: Jiunn-Tsair Chen, Taipei (TW); Gerard Joseph Foschini, Sayerville, NJ (US); Constantinos Basil Papadias, Madison, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/353,460

(22) Filed: Jul. 13, 1999

Related U.S. Application Data

(60) Provisional application No. 60/137,462, filed on Jun. 4, 1999.

(51) Int. Cl.
*H04B 7/216* (2006.01)

(52) U.S. Cl. ...................................... 370/335; 370/342

(58) Field of Classification Search ............... 455/3.02, 455/3.05, 3.06, 434, 450–455, 500, 509, 455/511, 515, 517, 63, 103; 370/320, 329–330, 370/335–336, 342, 436, 441
See application file for complete search history.

(56) References Cited

U.S. PATENT DOCUMENTS

| | | | | | |
|---|---|---|---|---|---|
| 5,260,968 | A | * | 11/1993 | Gardner et al. ............. | 375/347 |
| 5,280,472 | A | * | 1/1994 | Gilhousen et al. .......... | 370/335 |
| 5,751,761 | A | * | 5/1998 | Gilhousen ................... | 375/146 |
| 5,764,687 | A | * | 6/1998 | Easton ........................ | 375/147 |
| 5,790,589 | A | * | 8/1998 | Hutchison et al. .......... | 375/149 |
| 5,831,977 | A | * | 11/1998 | Dent ........................... | 370/335 |
| 5,889,768 | A | * | 3/1999 | Storm et al. ................. | 370/320 |
| 6,061,339 | A | * | 5/2000 | Nieczyporowicz et al. . | 370/335 |
| 6,084,547 | A | * | 7/2000 | Sanderford et al. ......... | 342/457 |
| 6,163,524 | A | * | 12/2000 | Magnusson et al. ........ | 370/208 |
| 6,212,406 | B1 | * | 4/2001 | Keskitalo et al. ........ | 455/562.1 |
| 6,232,927 | B1 | * | 5/2001 | Inoue et al. ................. | 343/844 |
| 6,259,924 | B1 | * | 7/2001 | Alexander et al. ....... | 455/456.2 |
| 6,414,946 | B1 | * | 7/2002 | Satou et al. ................. | 370/328 |
| 6,473,395 | B1 | * | 10/2002 | Lee ............................. | 370/209 |
| 6,504,827 | B1 | * | 1/2003 | Kuo et al. ................... | 370/329 |
| 6,560,194 | B1 | * | 5/2003 | Gourgue et al. ............ | 370/203 |

FOREIGN PATENT DOCUMENTS

| | | |
|---|---|---|
| GB | 2 285 900 A | 7/1995 |
| WO | WO 98 17077 A | 4/1998 |

OTHER PUBLICATIONS

European Search Report dated May 10, 2001 for Application No. 00304341.1-2211.
Chen, J.-T., et al., "Dynamic Signature Assignment For Reverse-Link CDMA Systems," 1999 IEEE International Conference on Communications, Vancouver, Canada, Jun., 1999, vol. 2 pp. 912-916.

* cited by examiner

*Primary Examiner*—Chi Pham
*Assistant Examiner*—Thai Hoang

(57) ABSTRACT

A CDMA wireless communication system for communicating with wireless terminals. The system comprises a channel estimator for determining characteristics of the wireless channels of the wireless terminals. The channel characteristics are used by a code optimizer to assign spreading codes to the wireless terminals. In one embodiment, the code optimizer utilizes an iterative code optimization algorithm and maintains a processing set of wireless terminals. The code optimizer chooses target wireless terminals and performs a random code search in order to find an improved code for the target wireless terminal. The improved code found in the random code search is further improved by performing a gradient search of codes in the signal space in the vicinity of the improved code and by performing a gradient search of transmission delays. The improved codes are transmitted to the wireless terminals for use in reverse link communication.

8 Claims, 4 Drawing Sheets

| CONFIDENCE LEVEL | SEARCH FOR A BETTER SIGNATURE ASSIGNMENT | | | SEARCH THROUGH A FIXED NUMBER OF ASSIGNMENTS | | |
|---|---|---|---|---|---|---|
| | 10% | 1% | 0.1% | 10% | 1% | 0.1% |
| 50% | 2 | 4 | 7 | 7 | 69 | 693 |
| 90% | 4 | 7 | 10 | 22 | 230 | 2302 |
| 99% | 6 | 10 | 14 | 44 | 458 | 4603 |

CODE ASSIGNMENT IN A CDMA WIRELESS SYSTEM

This application claims the benefit of U.S. Provisional Application Ser. No. 60/137,462, filed Jun. 4, 1999.

FIELD OF THE INVENTION

The present invention relates generally to code division multiple access (CDMA) wireless communication systems. More particularly, the present invention relates to code assignments in CDMA wireless communication systems.

BACKGROUND OF THE INVENTION

Wireless communication systems in which wireless terminals (e.g. fixed or mobile) communicate with fixed base stations via a wireless channel are well known in the art. Since the wireless spectrum bandwidth is limited, various techniques have been developed to allow multiple wireless terminals to share the limited bandwidth. One technique is time division multiple access (TDMA) in which wireless terminals share a single frequency but are separated in the time domain with each wireless terminal being assigned a time slot. Another technique is frequency division multiple access (FDMA) in which wireless terminals are separated in the frequency domain, with each wireless terminal being assigned a particular frequency.

The present invention is concerned with another technique for sharing limited spectrum, namely code division multiple access (CDMA). In a CDMA system, the signals of all wireless terminals share a frequency band and are sent together in time. The signals of different wireless terminals are differentiated using codes. Each wireless terminal is assigned a unique code (S) (also known as a spreading code or signature). The signal (d) transmitted from a particular wireless terminal to the base station is combined with the wireless terminal's unique code S to generate an encoded signal over a wide band of frequencies. If there are K wireless terminals (1, 2, . . . K), the signal of the $k^{th}$ wireless terminal is represented as $\{d_k(\bullet)\}$ and the code of the $k^{th}$ wireless terminal is represented as $S_k$. The transmitted signal for the $k^{th}$ wireless terminal at the ith time instant is represented as $d_k(i)S_k$. Thus, the combined signal for all the wireless terminals received at the base station is $d_1(i)S_1 + \ldots + d_K(i)S_K$. The codes are ideally designed to be orthogonal such that the signal of the kth wireless terminal may be extracted at the base station by multiplying the received signal with the wireless terminal's unique code $S_k$. Signals originating at the base station are also combined with a code prior to being transmitted to each wireless terminal. Upon receipt of the signals, the wireless terminal extracts the signals from the base station by multiplying its received signal by appropriate codes. CDMA technology is well known in the art of wireless communications and will not be described in further detail herein.

One problem with CDMA systems is inter-user interference (also known as multiple access interference (MAI)) which results from the leakage of signals of one wireless terminal into the signal of another wireless terminal. This leakage is due to several factors. First, there is multipath propagation which results in the same signal being propagated along multiple paths with different time delays. Moreover, the codes are usually not perfectly orghogonal in order to be able to accommodate a large number of terminals. This non-perfect orthogonality itself also contributes to inter-user interference. Also, received signals may not all be perfectly synchronized in time, which also contributes to the inter-user interference.

In order to deal with the interference problem, current systems generally perform complex operations at the receiver in an attempt to remove this unwanted interference. One approach of dealing with interference is single user processing, in which a receiver uses only knowledge of a single signal (e.g. the signal associated with a single wireless terminal) to process the incoming signal. A more sophisticated approach is multi-user processing, wherein the receiver uses knowledge of all signals in order to demodulate them all in a joint fashion. This multi-user approach is generally only performed at base stations because of the significant processing overhead which it requires.

SUMMARY OF THE INVENTION

We have realized that the interference experienced by a wireless terminal in a CDMA wireless communication system is a result of a synergy between the code assigned to the wireless terminal and the particular wireless channel through which the signals of the wireless terminal pass. Thus, a wireless terminal signal propagating through a particular wireless channel will experience different interference with different codes.

In accordance with the invention, codes in a CDMA wireless communication system are assigned based on characteristics of the wireless channels. By coordinating the assignment of codes among the wireless terminals based on the wireless channels, the total interference among the wireless terminals is reduced and performance of the overall wireless communication system is improved.

In accordance with one embodiment of the invention, an iterative code optimization algorithm maintains a processing set of wireless terminals. In accordance with the algorithm, when the codes for the wireless terminals within the processing set are optimized, additional wireless terminals are added to the processing set and the codes for the new processing set are optimized. This continues until the processing set consists of all the wireless terminals in the wireless system. This technique, called sequential packing, is advantageous because the code assignments are more likely to converge to the optimum solution when the number of wireless terminals is small and the optimal code assignment of a K-wireless terminal system is likely to be similar to that of a (K–1) wireless terminal system.

In accordance with another embodiment of the invention, during the processing of each processing set a technique called target wireless terminal isolation is used. Instead of updating all the codes for all the wireless terminals in the processing set, a target wireless terminal is chosen and its code is optimized prior to moving on to optimize the codes of the other wireless terminals in the processing set. This technique also speeds up convergence because before the convergence of the code optimization, most of the codes may have already achieved good orthogonal distribution. Disturbing all the codes would likely slow down the convergence speed.

In accordance with one embodiment of the optimization algorithm, the code of a target wireless terminal is assigned as follows. First, a random search of codes is performed in order to find a code which is an improvement over the currently assigned code. In one embodiment, the random search is performed by searching all available codes until an improved code is found. In an alternate embodiment, the random search is performed by searching a subset of all available codes for the best code in the subset. A performance analysis of these random search techniques is described in the detailed description. The new code found by the random search is then improved by performing a gradient search of codes. In accordance with this technique, the signal space which surrounds the new code is searched in order to further optimize the code for this wireless terminal. This gradient search of codes may be performed by searching the codes which result from making a small change to the code found by the random search. The new code found by the random search may also be improved by performing a gradient search of transmission delays. In accordance with this technique, the delay of transmission of the new code is adjusted by a small amount in order to determine the optimum delay of the code.

The invention provides advantages over the prior art systems. Interference is reduced at the outset by the assignment of codes based on channel characteristics, rather than randomly assigning codes at the outset and trying to remove the interference at the receiver. This substantially simplifies receiver processing.

These and other advantages of the invention will be apparent to those of ordinary skill in the art by reference to the following detailed description and the accompanying drawings.

DETAILED DESCRIPTION

Figure 1:
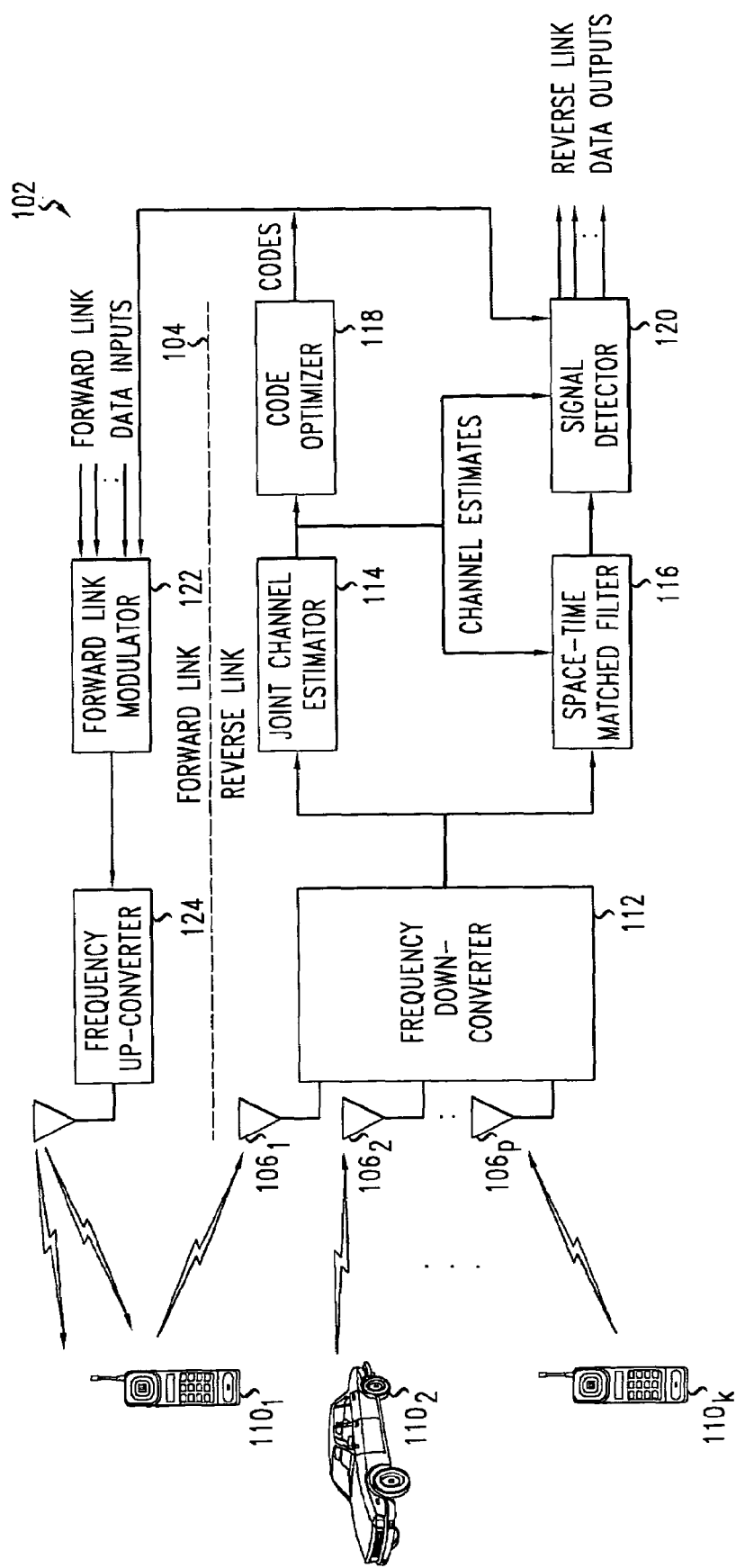
FIG. 1 shows a system in accordance with one embodiment of the invention.

A system in accordance with one embodiment of the present invention is shown in FIG. 1. Wireless terminals $110_1, 110_2, \ldots 110_K$ are communicating with base station 102 in accordance with the CDMA communication protocol. Broken line 104 represents a logical separation between forward link (i.e., base station to wireless terminals) components above the broken line 104 and reverse link (i.e., wireless terminals to base station) components below the broken line 104. Base station 102 comprises antennas $106_1, 106_2, \ldots 106_p$ for receiving signals from the wireless terminals 110. A frequency down converter $111_2$ receives the signals from the wireless terminals $111_0$ and demodulates the signals to extract baseband signals. Thus, the output of frequency downconverter $111_2$ is the combined baseband signal from all wireless terminals $\kappa_{p1}d_1(i)S_1 + \ldots + \kappa_{pK}d_K(i)S_K$, where $\kappa_{pk}$ is the combined effect of the wireless channel of the kth terminal and the pth antenna element. Note that the signal model used herein does not assume intersymbol interference (ISI), but one skilled in the art could readily extend the model to include ISI. The combined signal is provided to a joint channel estimator 114 and a space-time matched filter 116. The joint channel estimator 114 receives the baseband signal and determines the characteristics of the wireless channels $\kappa_{pk}$ over which the signals have been received.

The wireless channel is described by a multi-path propagation model. A mathematical description of the model which provides a basis for a further description of the elements of FIG. 1 will now be given. In large cells with high base station antenna platforms, the propagation channel comprises a few dominant specular paths. In such a case, the baseband signal received by the base station 102 can be expressed as follows:

$$x(t) = \sum_{k=1}^{K} \sum_{l=1}^{L} a(\theta_{k,l}) \beta_{k,l}(t) \tilde{s}_k(t - \tau_{k,l}) + n(t) \tag{1}$$

where x(t) is the received baseband signal as a function of time t; n(t) is the additive noise; K is the number of wireless terminals visible to the base station 102; L is the maximum number of propagation paths present in the system for each wireless terminal; $a(\theta_{k,l})$ is the steering vector of wireless terminal k to a signal arriving from direction $\theta_{k,i}$; $\beta_{k,1}$ is the complex time-varying amplitude of the $l^{th}$ path of the $k^{th}$ wireless terminal, with the path amplitude being a complex Gaussian random process including both the propagation loss and the signal fading caused by the Doppler spread; $\tilde{s}_k$ is the transmitted complex baseband signal from the $k^{th}$ wireless terminal; $\tau_{k,1}$ is the propagation delay of the $l^{th}$ path of the $k^{th}$ wireless terminal.

In a CDMA system with the length of the spreading code N equal to the number of chips in a symbol period, the transmitted signal $\tilde{s}$ can be represented as the convolution of the data bits, the codes and the pulse-shaping function. Assuming band-limited signals in the system, if each continuous signal is sampled at a rate which is higher than twice the Nyquist rate, then the convolution, correlation, and integration operations can be replaced by multiplication of matrices with appropriate arrangements of matrix elements from the sampled data. In the present embodiment, we assume P antennas, and we oversample the signals with a factor of $\rho$ (i.e., we sample the signal $\rho$ times in each chip). In addition, there are N chips in each data symbol, and M data symbols are considered. We also assume that the maximum path delay plus the length of the pulse-shaping function is no greater than $QT_c$ and that Q<N, where $T_c$ is the chip period (if Q is much smaller than N, then the system is quasi-synchronous). After sampling, we can express the received signal X as $$X = \sum_{k=1}^{K} A_k B_k G_k S_k D_k + N \tag{2}$$

where X: P×MNρ and N: P×MNρ are, respectively, the received signal and the additive Gaussian noise; $A_k$: P×L is given by $A_k = [a(\theta_{k,1}) a(\theta_{k,2}) \ldots a(\theta_{k,L})]$; $B_k$:L×L is given by $B_k = \text{diag}\{\beta_k\}$ with $\beta_k = [\beta_{k,1}, \beta_{k,2}, \ldots, \beta_{k,L}]^T$; and the i,j$^{th}$ element of $G_k$: L×Qρ can be written as $$g\left(t_0 + \frac{j-1}{\rho}T_c - \tau_{k,i}\right)$$

with g(.) being the normalized pulse-shaping function. The code matrix $S_k$: $Q\rho \times (N+Q-1)\rho$ is a Toeplitz matrix with $[s_{k,1}, 0_{1\times(Q\rho-1)}]^T$ as its first column, and $[s_{k,1}, 0_{1\times(\rho-1)}, s_{k,2}, 0_{1\times(\rho-1)}, \ldots, s_{k,N}, 0_{1\times(Q\rho-1)}]$ as its first row, where $s_{k,1}, s_{k,2}, \ldots, s_{k,N}$ is the normalized code of the $k^{th}$ wireless terminal. The data matrix $D_k$: $(N+Q-1)\rho \times MN\rho$ is also a Toeplitz matrix with $[d_{k,m-1}, 0_{1\times(N\rho-1)}, d_{k,m-1}, 0^{1\times((Q-1)\rho-1)}]^T$ as its first column, and $[d_{kt}, 0_{1\times(N\rho-1)}, d_{k,m+1}, 0_{1\times(N\rho-1)}, \ldots d_{k,m+M-1}, 0_{1\times(N\rho-1)}]$ as its first row, where $\{d_{k,m}\}$ are the binary phase shift keying (BPSK) data bits of the $k^{th}$ wireless terminal.

In addition, the temporal signature matrix $\tilde{S}_k$: $L\times(N+Q-1)\rho$ is defined as $\tilde{S}_k = G_k S_k$. The $l^{th}$ row of $\tilde{S}_k$ denotes the temporal signature of the $l^{th}$ path of the $k^{th}$ wireless terminal seen at the receiver. Similarly, the $l^{th}$ column of $A_k$ denotes the spatial signature of the $l^{th}$ path of the $k^{th}$ wireless terminal. If we consider the impulse response of the wireless channel, and assume there is only one symbol transmitted for each wireless terminal, then $D_k$ equals $d_{k,1}$ times an identity matrix. After stacking the columns of X, equation (2) can be written as $$vec(X) = \sum_{k=1}^{K} d_{k,l}(\tilde{S}_k^T \circ A_k)\beta_k \quad (3)$$

$$= \sum_{k=1}^{K} d_{k,l} \sum_{l=1}^{L} \beta_{k,l} a(\tilde{S}_{k,l} \otimes \theta_{k,l}) + vec(N) \quad (4)$$

where the "vec" operator stacks columns of a matrix putting them one below another, $\otimes$ denotes the Kronecker product, $\circ$ denotes the Khatri-Rao product (column-wise Kronecker product), and $\tilde{S}_{k,l}$ is the $l^{th}$ row of $\tilde{S}_k$. Thus, $\tilde{S}_{k,l} \otimes a(\theta_{k,l})$ is the space-time signature of the $l^{th}$ path of the $k^{th}$ wireless terminal. If there is more than one symbol transmitted for each wireless terminal, inter-symbol interference results in space-time signatures overlapped in time within the received signal X.

Returning now to FIG. 1, the joint channel estimator 114 receives the baseband signal and, using the above described model, determines characteristics of the channels of the wireless terminals 110. Channel information including the path DOAs (direction of arrival) $\{\theta_{k,l}\}$, the propagation delays $\{\tau_{k,l}\}$, and the complex path fading amplitudes $\{\beta_{k,l}\}$ are required in the space time matched filter 116, the signal detector 120, and the code optimizer 118. The joint channel estimator 114 determines these channel characteristics as follows.

The joint channel estimator 114 estimates the path DOAs $(\theta_{k,l})$ and the propagation delays $(\tau_{K,1})$ by using known subspace-based algorithms. Appropriate sub space-based algorithms which may be used by the joint channel estimator 114 are described in, M. C. Vanderveen, C. B. Papadias, and A. Paulraj, *Joint Angle and Delay Estimation (JADE) for Multi-Path Signals Arriving at an Antenna Array*, IEEE Communications Letters, vol. 1, no. 1, pp. 12–14, January 1997. Since both the path DOAs and the propagation delays usually remain unchanged over a long period of time, the above referenced subspace-based algorithms may be used in order to obtain accurate channel estimations. For purposes of this description, it is assumed that we have perfect information on the path DOAs and the propagation delays as a result of one of the above referenced algorithms. With the path DOAs and propagation delays available, $\{A_k\}$ can be reconstructed by using the array manifold a(.) and $\{G_k\}$ can be reconstructed by using the temporal manifold g(.). Note that $\{S_k\}$ denotes the wireless terminal codes, which are known to the base station 102. The only remaining unknowns left in equation (2) are $\{B_k\}$ and $\{D_k\}$, which are the complex path fading amplitudes and the transmitted data symbol matrix respectively. The data symbol matrix can be obtained by using known training sequences or in a decision-directed fashion, i.e., the demodulated data symbols can be easily used as training data. To estimate $\{B_k\}$, we can re-write equation (2) as $$X = [A_1, A_2, \ldots, A_K] \, diag(B_1, B_2, \ldots, B_K) diag \\ (G_1, G_2, \ldots, G_K) \, diag(S_1, S_2, \ldots, S_K)[D_1^T 1, D_2^T, \ldots, D_K^T]^T + N \quad (5)$$

$$= ABGSD + N, \quad (6)$$

where $A=[A_1, A_2, \ldots, A_K]$; $B=\text{diag}(B_1, B_2, \ldots, B_K)$; $G=\text{diag}(G_1, G_2, \ldots, G_K)$; $S=\text{diag}(S_1, S_2, \ldots, S_K)$; and $D=[D_1^T 1, D_2^T, \ldots, D_K^T]^T$. The least square criterion is used to estimate the fading amplitudes hat $\beta$ as $$\hat{\beta} = ((GSD)^T \circ A)^+ vec(X) \quad (7)$$

where $\hat{\beta} = [\hat{\beta}_1^T \hat{\beta}_2^T, \ldots, \hat{\beta}_K^T]^T$ with $\hat{\beta}_k$ being the least square estimate of $\beta_k$; and $(.)^+$ denotes the pseudo-inverse.

The channel estimates calculated by the joint channel estimator 114 are provided to space-time matched filter 116, code optimizer 118, and signal detector 120.

The space-time matched filter 116 is used to obtain sufficient statistics for demodulating the digitally modulated signals. The output of the space-time matched filter 116 may be written as $$\bar{X}_{k,m} = \text{Re}\{tr[B_k * A_k * X^m \tilde{S}_k *]\}. \quad (8)$$

Where "tr" denotes the trace of a matrix, and $X^m$: $P\times(N+Q-1)\rho$ is copied from the $((m-1)n\rho+1)^{th}$ to $(mN\rho+Q\rho)^{th}$ columns of Y. The matrix multiplication of $A_k^*$ and $X^m$ denotes the path-wise beam-forming. Let $\bar{X}_{k,m} = A_k^* X^m$. The trace of the matrix multiplication tr $\{B_k^* \bar{X}_{k,m} \tilde{S}_k^*\}$ denotes the matched filter for the temporal signature and the maximum-ratio path combining of the $k^{th}$ wireless terminal. To expand $\bar{X}_{k,m}$, equation (8) can be rewritten as $$\bar{X}_{k,m} = \sum_{i=1}^{K} \text{Re}\{tr\{B_k^* A_k^* A_i B_i \tilde{S}_i D_i^m \tilde{S}_k^*\}\} + \text{Re}\{tr\{B_k^* A_k^* N^m \tilde{S}_k^*\}\} \quad (9)$$

where $N^m$ and $D_i^m$ are the sub-matrices of N and $D_i$ respectively, so $X^m$ is constructed from X. Note that $D_i^m$ is a Toeplitz square matrix with $[d_{i,m}, 0_{1\times(N\rho-1)}, d_{i,m-1}, 0_{1\times((Q-1)\rho-1)}]^T$ as its first column, and $[d_{i,m}, 0_{1\times(N\rho-1)}, d_{i,m-1}, 0_{1\times((Q-1)\rho-1)}]$ as its first row. Therefore, the first term on the right hand side of equation (9) can be written as $$= \sum_{i=1}^{K} \text{Re}\{d_{k,m}\beta_k^*((A_k^*A_i) \odot (\tilde{S}_i\tilde{S}_k^*)^T)\beta_i + \qquad (10)$$
$$d_{k,m-1}\beta_k^*((A_k^*A_i) \odot (\tilde{S}_i(+1)\tilde{S}_k^*(-1))^T)\beta_i +$$
$$d_{k,m+1}\beta_k^*((A_k^*A_i) \odot (\tilde{S}_i(-1)\tilde{S}_k^*(+1))^T)\beta_i\},$$

where $\odot$ denotes the Hadamard product or the entry-wise product, $\tilde{S}_k(+1)$ and $\tilde{S}_k(-1)$ are both sub-matrices of $\tilde{S}_k$. The rightmost and the left most $(Q-1)\rho$ columns $\tilde{S}_k$ are respectively denoted by $\tilde{S}_k(+1)$ and $\tilde{S}_k(-1)$. For additional information on the Hadamard product/entry-wise product, see Roger A. Hurn and Charles R. Johnson, *Topics in Matrix Analysis*, Cambridge University, Press 1991.

We can stack the matrices and write the received signal at the output of the space-time matched filter 116 as $$\overline{X} = \mathcal{H}d + \overline{N} \qquad (11)$$

where $\overline{X}=[\overline{X}_{1,1}, \overline{X}_{2,1}, \ldots, \overline{X}_{K,1}, \overline{X}{1,2}, \ldots, \overline{X}_{K,M}]^T$, $d=[d_{1,1}, d_{2,1}, \ldots, d_{K,M}]^T$, and $\overline{N}=[\overline{N}_{1,1}, \overline{N}_{2,1}, \ldots \overline{N}_{K,1}, \overline{N}_{1,2}, \ldots, \overline{N}^{K,M}]^T$ with $\overline{N}_{k,m}=\text{Re}\{\text{tr}\{B_k^*A_k^*N^m\tilde{S}_k^*\}\}$. If we define $H(0)$: K×K, $H(+1)$: K×K, and $H(-1)$: K×K as $$H(0)=B^*((A^*A)\odot(\tilde{S}\tilde{S})^T)B \qquad (12)$$

$$H(+1)=B^*((A^*A)\odot(\tilde{S}(+1)\tilde{S}^*(-1))^T)B, \qquad (13)$$

$$H(-1)=B^*((A^*A)\odot(\tilde{S}(-1)\tilde{S}^*(+1))^T)B \qquad (14)$$

with
$A=[A_1, A_2, \ldots, A_K]$, $\tilde{S}=[\tilde{S}_1^T, \tilde{S}_2^T, \ldots, \tilde{S}_K^T]^T$, $\tilde{S}(+1)=[\tilde{S}_1^T(+1),\tilde{S}_2^T(-1), \ldots, \tilde{S}_K^T(+1)]^T$, $\tilde{S}(-1)=[\tilde{S}_1^T(-1), \tilde{S}_2^T(-1), \ldots, \tilde{S}_K^T(-1)]^T$
and define the fading amplitude matrix B: K L×K as B diag $((\beta_1, \beta_2, \ldots, \beta_K))$, then can be expressed as $$\mathcal{H} = \text{Re}\left\{\begin{bmatrix} H(0) & H(-1) & & 0 \\ H(+1) & H(0) & H(-1) & \\ & H(+1) & H(0) & H(-1) \\ & \vdots & \vdots & \vdots \\ 0 & & H(+1) & H(0) \end{bmatrix}\right\}. \qquad (15)$$

The output of the space-time matched filter 116 is provided to the signal detector 120. The signal detector 120 also receives the channel estimations from the joint channel estimator 114 and the codes which are output from the code optimizer 118. We assume that only $K_0$ in-cell wireless terminals need to be demodulated at the base station 102. Therefore, only the space time matched filter 116 outputs related to these $K_0$ wireless terminals are processed in the signal detector 120. We now describe three possible embodiments of the signal detector 120.

First, signal detector 120 may be implemented as a single wireless terminal detector. In this embodiment $K_0$ slicers are used at each output of the space-time matched filter 116. Decisions are instantaneous with no delay. The data estimate is given by $$\hat{d}_{k,m}=\text{sgn}(\overline{X}_{k,M}), \qquad (16)$$

where $\overline{X}_{k,m}$ is the output of the space time matched filter 116 in equation (8). In a second embodiment, signal detector 120 may be implemented as a decorrelator. In this embodiment, a zero-forcing solution is applied to solve equation (11). The data estimate can then be written as $$\hat{d}=\mathcal{H}^+\overline{X}. \qquad (17)$$

In a third embodiment, signal detector 120 may be implemented as a minimum mean square error (MMSE) detector. This embodiment generally performs better than the zero-forcing solution of the decorrelator in the second embodiment, when taking into account the effect of the correlated noise. The coloring matrix of the noise, $\overline{N}$ in equation (11), at the output of the space time matched filter 116 is given by:

$$E(\overline{NN}^*) = \frac{\sigma_n^2}{2}\mathcal{H} \qquad (18)$$

The data estimate for the MMSE detector can then be expressed as $$\hat{d} = \mathcal{H}^*\left(\mathcal{H}\mathcal{H}^* + \frac{\sigma_n^2}{2\sigma_b^2}\mathcal{H}\right)^{-1}\overline{X}, \qquad (19)$$

where $\sigma_n^2$ denotes the noise variance chosen to match the desired with $$\frac{E_b}{N_0}$$

with $E_b$ being the bit energy and $N_0$ being the average noise variance, and $\sigma_b^{2=1}$ for the BPSK modulation scheme. It is noted that in both the decorrelator and the MMSE detector embodiments, the maximum possible delay could be up to M symbols because of the block processing of the asynchronous signals. The reverse link data outputs of the signal detector 120 may be provided to, for example, a telephone network node such as a switch.

In accordance with the invention, the base station 102 includes a code optimizer 118 for assigning codes to wireless terminals. The steps performed by the code optimizer 118 will be described in conjunction with the flowchart of FIG. 2. In one embodiment, the code optimizer 118 is implemented using a computer processor executing stored computer program code. Thus, the code optimizer operates under control of the processor executing stored computer program code. The computer program code defines the steps described herein in conjunction with the flowchart of FIG. 2. Given the description contained herein, one skilled in the art could readily implement the code optimizer 118 in other ways. For example, the code optimizer 118 could also be implemented using hardware, or some combination of hardware and software.

Figure 2:
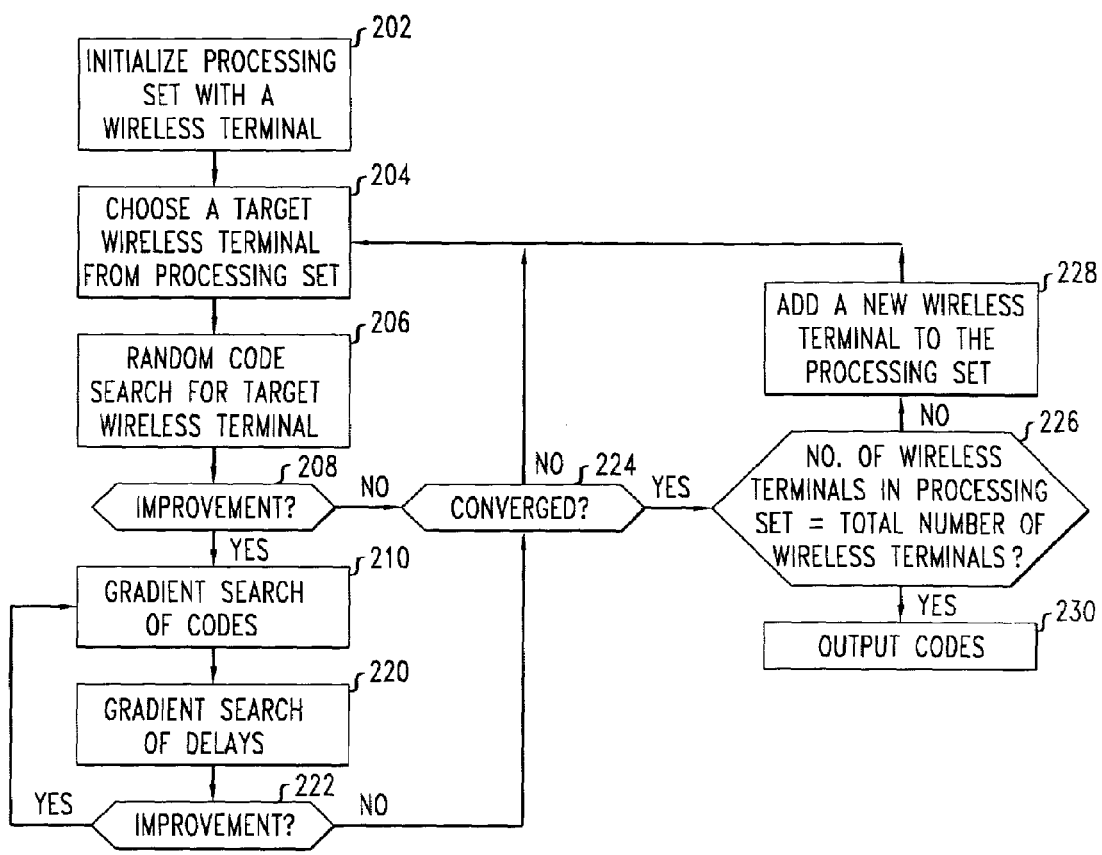
FIG. 2 is a flowchart of the steps performed to assign codes to wireless terminals in accordance with one embodiment of the invention.

The steps shown in the flowchart of FIG. 2 are performed by the code optimizer 118 in order to optimize the codes assigned to the wireless terminals communicating with the base station 102. In step 202, as processing set is initialized with one of the wireless terminals. In step 204 a target wireless terminal is chosen from the processing set. If step 204 is executed immediately following step 202, then there will only be one wireless terminal in the processing set and that wireless terminal will be chosen as the target wireless terminal. In step 206 a random code search is performed for the wireless terminal chosen as the target in step 204. The random code search is performed in order to try to improve the current code assigned to the target wireless terminal by attempting to reduce the interference experienced by the target wireless terminal.

One way to suppress the mutual interference among the wireless terminals is to maximize the minimum signal to interference-plus-noise ratio (SINR) $\zeta_{min}$ among in-cell wireless terminals, where $$\xi_{\min} = \min_{k=1,2,\ldots,K_0} \xi_k. \tag{20}$$

The SINR of the $k^{th}$ wireless terminal $\xi_k$ can be written as the power ratio of the signal and the interference-plus-noise:

$$\xi_k = \frac{\xi_{S,k}}{\xi_{I,k} + \xi_{N,k}} \tag{21}$$

The signal power $\xi_S$:K×1 can be written as $$\xi_S = diag(H(0)) \odot conj(diag(H(0))), \tag{22}$$

where H(0) is given in equation (12), "conj" is the complex conjugate operation, and the output of diag(.) is a column vector consisting of the diagonal elements of the argument matrix. The interference power $\xi_I$:K×1 can be written as $$\xi_I = diag(HH^*) - \xi_S, \tag{23}$$

where H=[H(−1),H(0),H(+1)], and H(0), H(+1) and H(−1) are given in equations (12), (13) and (14) respectively. The noise power $\xi_N$: K×1 can be written as $$\xi_N = \frac{\sigma_n^2}{2} diag(H(0)). \tag{24}$$

Note that in using the minimum SINR as the criteria for code optimization, two factors are taken into consideration: 1) the received power of each wireless terminal at the base station, and 2) the orthogonality among codes.

Although some out-of-cell wireless terminals may generate interference with respect to in-cell wireless terminals we assume that the only visible wireless terminals are in-cell wireless terminals such that K=K₀. For systems with a high frequency re-use factor this is a reasonable assumption.

We now return to step 206 of FIG. 2 in which the code optimizer 118 performs a random code search. The less dense regions of the signal space must be explored in order to maximize the distances between the wireless terminal codes. More particularly, we need to adopt some of the un-used codes by random search in order to span the entire signal space. It is also noted that a good code for one wireless terminal may not necessarily be a good code for another wireless terminal because the wireless channel of each wireless terminal is different. Therefore, a random-searching procedure of codes is required for each wireless terminal in order to cover those less dense areas in the signal space. When the number of wireless terminals is small compared to the dimension of the signal space, it is easier to find a less dense area by random searching. Otherwise, longer searching may be required. We now describe two alternate techniques for performing the random code search step 206. The first technique is to continue searching all the possible codes until a better code is obtained. If the number of wireless terminals is large compared to the dimension of the signal space, it may take a long time to find a better code. The second technique is to only search a subset of randomly-picked codes, and choose the best code in the subset if it is better than the original code prior to the random search. If the number of wireless terminals is small compared to the dimension of the signal space, the second approach might require a large amount of unnecessary searching. However, if the number of wireless terminals is large compared to the dimension of the signal space, this second technique might stop at a sub-optimal value. One skilled in the art would recognize that other techniques could be used to implement the random code search.

Although it is unlikely that the best code will be found by the random search step 206, the best available code is likely to be in the vicinity of the less dense area in the signal space which surrounds the code found in step 206. Thus, the code for the target wireless terminal may be further optimized by gradient-searching this less dense area in the signal space.

In step 208 it is determined whether the random code search of step 206 resulted in an improvement of the SINR for the target wireless terminal. If there was an improvement, then in steps 210 and 220 two types of gradient searches are performed in order to find the best code for this wireless terminal. In step 210 a gradient search of codes is performed as follows. A small change is made to the code of the target wireless terminal to determine if there is improvement in terms of the minimum SINR. Assume the length of the code is N chips long. N different codes are generated by individually changing the sign of each chip in the code. These N different codes are then compared with the original code. If none of the new N codes performs better than the original code, then the gradient search of codes is considered to be converged. Otherwise, the original code is replaced with the best code among the N new codes, and the same process is repeated. Note that the change of the sign of only one chip in the code results in only a minimum change of the code on the transmission side.

It is expected that such a minimum change in direction will also result in only a minor change of the code as seen at the receiver.

In step 220 a gradient search of transmission delays is performed as follows. The delay of transmission of the wireless terminal code is adjusted by small step ΔT in order to determine the optimum delay of a specific code. Assuming band-limited signals, the step size ΔT should be in inverse proportion to the signal bandwidth.

As represented by step 222, the gradient search of codes (step 210) and the gradient search of delays (step 220) continues until no further improvement in the SINR for the target wireless terminal is achieved. It is determined in step 224 whether the code searching steps (steps 204–222) have converged. Convergence of the code search is defined as the condition where there is no space for further improvement regardless of which target wireless terminal of the processing subset is picked. Convergence may be determined by repeating steps 204 through 208 until there is no improvement. Eventual convergence is guaranteed because there are only a finite number of possible code assignments, although this finite number $2^{KN} G^K$ could be very large, where G is defined as the number of possible transmission delays. There are a finite number of possible transmission delays because of finite resolution in time for the assumed band-limited signals in the system. If an exhaustive search is possible, the optimum assignment is guaranteed. Otherwise, since we are constantly looking for a better minimum SINR, the proposed algorithm can at least converge a local optimal solution.

Returning to FIG. 2, if the test in step 224 is no, then control returns to step 204 and a new wireless terminal from the processing set is chosen as the target wireless terminal and the code search of steps 206–222 are repeated. Note that the new target may be a wireless terminal already chosen during this processing loop. If the test in step 224 is yes, then in step 226 it is determined whether the number of wireless terminals in the processing set equals the total number of wireless terminals communicating with base station 102. If not, then in step 228 another wireless terminal is added to the processing set and steps 204 through 224 are repeated for the new processing set. If it is determined in step 226 that the number of wireless terminals in the processing set equals the total number of wireless terminals communicating with base station 102, then in step 230 the codes which are currently assigned to the wireless terminals are output from the code optimizer 118 and processing ends.

Returning now to FIG. 1, the optimized codes from code optimizer 118 are provided to the signal detector 120 and to the forward link modulator 122. The forward link modulator 122 also receives forward link data inputs which may be, for example, telephone signals from a telephone network. The forward link modulator 122 modulates the forward link data and the codes received from the code optimizer 118 and provides the modulated signal to the frequency up-converter 124. The frequency up-converter 124 transmits the signal to the wireless terminals 110 via antenna 126. In this manner, the newly assigned codes are transmitted to the wireless terminals 110. The wireless terminals then use the newly assigned codes for subsequent reverse link communication. As described above the signal detector 120 also receives the new codes from the code optimizer 118 so that the signal detector 120 can decode the subsequent reverse link communication.

Thus, as described above in connection with one advantageous embodiment, the use of a processing set results in an iterative algorithm in which wireless terminals are added into the processing subset one by one and only after the code optimization procedure has converged for the prior processing set. This technique, which we call sequential packing, is advantageous because the code assignments are more likely to converge to the optimum solution when the number of wireless terminals is small. Furthermore, the optimal code assignment of a K-wireless terminal system is likely to be similar to that of a (K−1) wireless terminal system.

Further, during the processing of each processing set, we use the technique of target wireless terminal isolation. Instead of updating all the codes for all the wireless terminals in the processing set, we isolate a target wireless terminal each time and optimize its code before moving on to optimize other wireless terminal codes. This also speeds up convergence because before the convergence of the code optimization, most of the codes may have already achieved good orthogonal distribution. Disturbing all the codes would likely slow down the convergence speed.

The following portion of the description addresses performance issues of the above described code assignment techniques. The performance of the algorithm described in conjunction with FIG. 2 depends on the number of wireless terminals, the dimension of the signal space, the overall channel of each wireless terminal, and the adaptation procedure used for code optimization.

Figure 3:
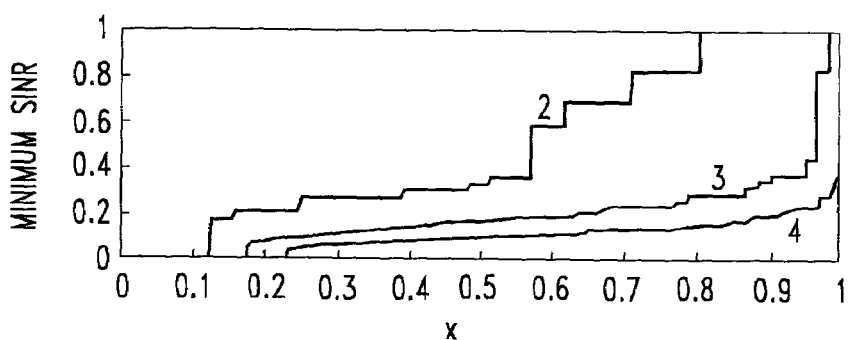
FIG. 3 is a graph showing the minimum SINR distribution in an example system.

In general, there are $2^{KN}\,G^K$ possible code assignments, where G is defined as the number of possible transmission delays, K is the number of wireless terminals, and N is the length of a code. There are a finite number of possible transmission delays because of the finite resolution in time for the assumed band-limited signals in the system. The minimum SINR can be calculated for each code assignment. System performance is improved in accordance with the described technique of replacing the original random signature assignment with one of the best signature assignments if possible, and thus improve the minimum SINR. FIG. 3 shows an example of the minimum SINR distribution in a simple system in which we assume a synchronous system with only one path of unit gain for each wireless terminal, i.e., G=1, a code of 4 chips long, up to 4 wireless terminals, a single antenna, and $$\frac{E_b}{N_0} = \infty.$$

Figure 4:
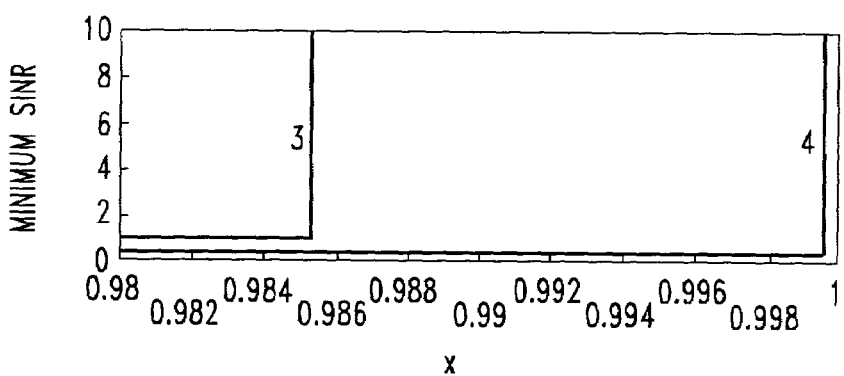
FIG. 4 is a graph showing the top 2 percent performance of FIG. 3.

Each curve in FIG. 3 is labeled by the number of wireless terminals in the system. J is defined as the total number of possible code assignments, and therefore, J=256, 4096, and 65536, for two, three, and four wireless terminals respectively. In FIG. 3 the minimum SINR vs. x is plotted, where the minimum SINR is sorted in ascending order, $$x = \frac{j}{J},$$

and j is the code assignment number after sorting. Therefore, the horizontal axis of FIG. 3 represents the percentage of the bottom performance among all the possible code assignments. Note that the minimum SINR is very low most of the time without code assignment optimization regardless of the number of wireless terminals in the system. The improvement on the minimum SINR caused by reassigning the wireless terminal codes is very significant when the number of wireless terminals is close to the dimension of the signal space. When the number of wireless terminals is small, the improvement is still great but not as significant, because it is relatively easy to separate the code vectors in the signal space. In FIG. 4, the top 2 percent performance of FIG. 3 is expanded. In this example, we can obtain orthogonal codes if the algorithm of FIG. 2 converges to the minimum SINR among the top 20 percent, top 1.5 percent and top 0.05 percent, respectively, when there are 2, 3 and 4 wireless terminals in the system.

The problem of how many searches are required to reach a specific percentage of the top minimum SINR performances is now addressed. The trade-off between the complexity of the search algorithm and the improvement on the SINR performance is also investigated. Since the number of possible code assignments J is usually a very large number, the efficiency of the code searching turns out to be an important issue. First, we analyze the probability of each code assignment getting picked using two basic strategies: 1) blindly searching all the possible codes assignments until a signature assignment with better minimum SINR is found, and 2) blindly searching $J_1$ code assignments and picking the best one.

We estimate the approximate number of blind searches in the algorithm and then compare this number to the number of blind searches required for the minimum SINR to reach a certain performance level. We first analyze the code assignment searching strategy in which all the possible code assignments are blindly searched until an assignment which achieves a better minimum SINR than the current assignment is found. $p_0(j)$ is defined as the probability of picking the $j^{th}$ signature assignment. For a system using pseudo random codes, the probability distribution is given as $$p_0(j) = \frac{1}{J}, \, j = 1, 2, \ldots, J.$$

Recall that the code assignments are sorted in ascending order. If the probability that the $j_1-1$ assignment gets picked next is zero, then the probability that any of the last $J-j_1$ assignments gets picked next is $$\frac{1}{J-j_1}.$$

Therefore, the probability distribution after the first cycle of searches $\{p_1(j)\}$ becomes $$p_1 = M p_0, \quad (25)$$

where $p_0 = [p_0(J), p_0(J-1), \ldots, p_0(1)]^T$, $p_1 = [p_1(J), p_1(J-1), \ldots, p_1(1)]^T$, and the transition matrix $M: J \times J$ is defined as $$M = \begin{bmatrix} 1 & 1 & \frac{1}{2} & \frac{1}{3} & \cdots & \frac{1}{J-1} \\ 0 & 0 & \frac{1}{2} & \frac{1}{3} & \cdots & \frac{1}{J-1} \\ 0 & 0 & 0 & \frac{1}{3} & \cdots & \frac{1}{J-1} \\ \vdots & \vdots & \vdots & \vdots & \ddots & \vdots \\ 0 & 0 & 0 & 0 & \cdots & \frac{1}{J-1} \\ 0 & 0 & 0 & 0 & \cdots & 0 \end{bmatrix} \quad (26)$$

From observing the structure of M, it is seen that this code assignment searching algorithm pushes the distribution of the minimum SINR toward the better side of performance. To further improve the minimum SINR, we can repeat the same searching strategy several times. If i search cycles are conducted, we can obtain a probability function $p_i$ given by $$p_i = M^i p_0 \quad (27)$$

Note that once a good minimum SINR has been obtained, the number of searches required in each search cycle increases as the searching continues, since it is getting more difficult to find an even slightly better minimum SINR. The average number of blind searches required at the $i^{th}$ cycle can be written as $$n_i = \sum_{j=1}^{J-1} p_i(j) \frac{J-1}{J-j} + (J-1) p_i(J) \quad (28)$$

The number of possible signature assignments J is usually a large number. Therefore, equations (25), (27) and (28) are difficult to evaluate. Thus we need to rewrite these equations in a continuous form. Let the $j^{th}$ assignment be the bottom $x(j)$ percent among J assignments, namely $$x = \frac{j}{J},$$

and let $p_i(x)$ be the probability density function of x after the $i^{th}$ search cycle. The probability density function after the first cycle of searching becomes $$p_1(x) = \int_0^x \frac{1}{1-x} dx = \ln \frac{1}{(1-x)}, \quad (29)$$

where "ln" denotes the natural log. Similarly, the probability density function after the $i^{th}$ cycle of searching becomes $$p_i(x) = \int_0^x p_{i-1}(x) \frac{1}{1-x} dx. \quad (30)$$

By solving equation (30), we obtain $$p_i(x) = \frac{1}{i!} \left( \ln \frac{1}{1-x} \right)^i, \quad (31)$$

where i! denotes factorial i. The cumulative distribution function (CDF) of the minimum SINR after the $i^{th}$ cycle of searching can then be written as $$p_i, CDF(x) = x - \sum_{k=1}^{i} \frac{1-x}{k!} \left( \ln \frac{1}{1-x} \right)^k. \quad (32)$$

In addition, the average number of blind searches in the $i^{th}$ search cycle can be written as $$n_i = \int_0^1 p_{i-1}(x) \frac{1}{1-x} dx. \quad (33)$$

Figure 5:
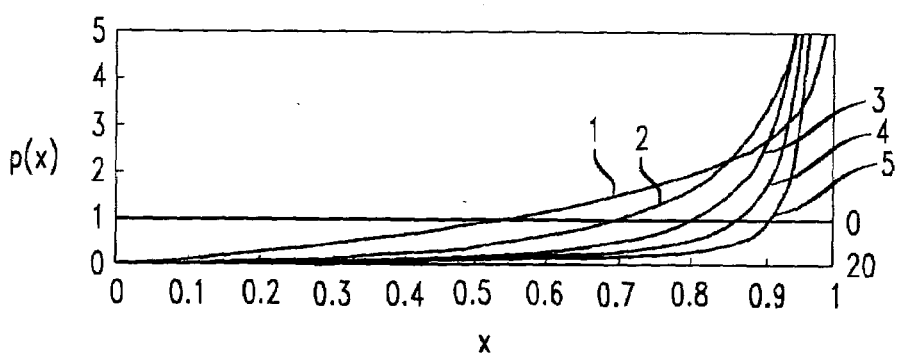
FIG. 5 is a graph showing the improvement of the probability density function of the minimum SINR using a first search strategy.
Figures 6, 7:
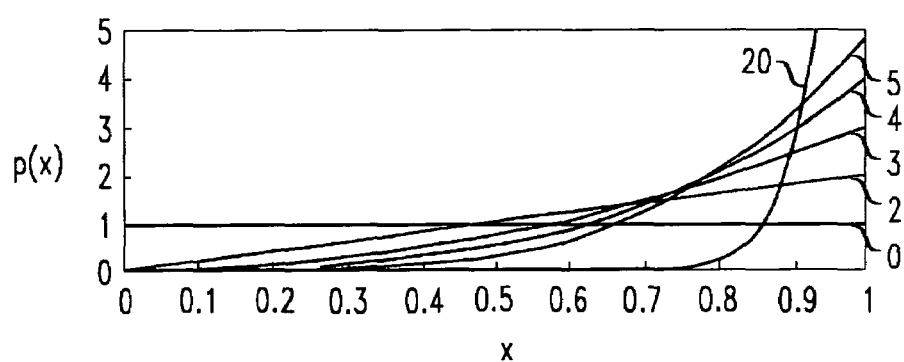
FIG. 6 is a graph showing the number of search cycles required to reach certain performance levels.
FIG. 7 is a graph showing the improvement of the probability density function of the minimum SINR using a second search strategy.

FIG. 5 shows the improvement of the probability density function of the minimum SINR using the random search technique of searching all possible codes until a code which is better than the current code is found. Each curve in the figure is labeled by the number of the search cycles. By comparing FIG. 3 with FIG. 5, the number of cycles of blind searches which are required to achieve a certain minimum SINR performance can be determined. FIG. 6 shows the number of blind search cycles required to reach certain performance levels for the two random search techniques. Section 602 of FIG. 6 shows the number of search cycles required to have 50, 90, and 99 percent chance for the search results to be among the top 10, 1 and 0.1 percent of performance of all possible code assignments for the first random search technique which searches until a better code is found. For example, to have a 90 percent chance to reach the top 1 percent of performance using the first random search technique, we need to search for a better assignment at least 7 times.

As described above, the second search strategy is to randomly search through a fixed number of code assignments to find the code with the best minimum SINR. If we search through i possible code assignments, the probability of picking the $j^{th}$ assignment $p_i(j)$ is given by $$p_i(j) = \begin{cases} \frac{C_{i-1}^{j-1}}{C_i^J} & \text{for } j \geq i \\ 0 & \text{for } j < i. \end{cases} \quad (34)$$

However, if we use i−1 pairwise comparisons to search through i possible code assignments and we allow the same code assignments to repeat within i assignments, we can modify $p_i(j)$ as follows: In each pairwise comparison, if the $j_1^{th}$ assignment is first used, there is a $$\frac{j_1 - 1}{J - 1}$$

chance that the $j_1^{th}$ assignment will be compared to an assignment with poorer minimum SINR, while there is a $$\frac{1}{J-1}$$

chance that the $j_1^{th}$ assignment will be compared to an assignment with better minimum SINR. Therefore, the probability of the first $j_1-1$ assignments getting picked next is zero; the probability of the same assignment getting picked next is $$\frac{j_1}{J-1};$$

and the probability of any of the better assignments getting picked next is $$\frac{1}{J-1}.$$

Thus, we can write $\{p_i\}$ as $$p_i = M^{i-1} p_0, \, i=2,3\ldots \quad (35)$$

where $p_0 = [p_0(J), p_0(J-1), \ldots, p_0(1)]^T$, $p_i = [p_i(J), p_i(J-1), \ldots, p_i(1)]^T$, and transition matrix M:J×J is defined as $$M = \begin{bmatrix} 1 & \frac{1}{J-1} & \frac{1}{J-1} & \cdots & \frac{1}{J-1} & \frac{1}{J-1} \\ 0 & \frac{J-2}{J-1} & \frac{1}{J-1} & \cdots & \frac{1}{J-1} & \frac{1}{J-1} \\ 0 & 0 & \frac{J-3}{J-1} & \cdots & \frac{1}{J-1} & \frac{1}{J-1} \\ \vdots & \vdots & \vdots & \ddots & \vdots & \vdots \\ 0 & 0 & 0 & \cdots & \frac{1}{J-1} & \frac{1}{J-1} \\ 0 & 0 & 0 & \cdots & 0 & 0 \end{bmatrix} \quad (36)$$

Again, the structure of the matrix M shows that this code assignment searching algorithm pushes the distribution of the minimum SINR toward the better side of the performance. Because J is usually a large number, equation (35) is not easy to evaluate. Therefore, $p_1$ is expressed in a continuous form as $$p_2(x) \int_0^x p_0(x) dx + p_0(x) x = 2x \quad (37)$$

assuming $p_0(x) = 1, x \in [0,1]$, and also $$p_i(x) = \int_0^x p_{i-1}(x) dx + p_{i-1}(x) x, \, i=3, 4 \ldots \quad (38)$$

By solving equation (38), we obtain $$p_i(x) = i x^{i-1}. \quad (39)$$

The CDF of the minimum SINR after searching through i signature assignments can then be written as $$p_i \text{CDF}(x) = x^i. \quad (40)$$

FIG. 7 shows the improvement of the probability density function of the minimum SINR using the second search strategy of searching through a fixed number of code assignments. Each curve in the figure is labeled by the number of assignments searched. Comparing FIG. 3 with FIG. 7, we can determine how many code assignments must be searched in order to achieve a certain minimum SINR performance. Section 604 of FIG. 6 shows the number of searches required to have 50, 90, and 99 percent chance for the search results to rank among top 10, 1 and 0.1 percent of performance of all possible code assignments using the second random search strategy.

There is a trade-off between the minimum SINR performance and the convergence speed. In the described algorithm, the convergence criterion, the step-size of the gradient search, and the technique of picking a target wireless terminal can be controlled in order to adjust the algorithm complexity and convergence speed. If the complexity of the assignment searching procedure is increased, then the minimum SINR performance is expected to improve, while it might take more time for the algorithm to converge. This trade-off is investigated in order to determine how much increase in algorithm complexity is required to achieve a certain performance improvement. The number of equivalent blind searches n̂ in the proposed algorithm is estimated. Based on n̂, and FIGS. 5–7, the improvement on the minimum SINR among all the possible code assignments is evaluated.

As described above, blind searches are generally inefficient regardless of the searching strategy used. In view of the above performance analysis, improvements for the searching techniques may be summarized as follows.

The random searches and the gradient searches serve the respective purposes of region dividing and local regional searching in the signal space. The random search first looks for the regions where a higher minimum SINR is more likely to occur. This random search may be seen as dividing the signal space into small regions and then finding one of the best regions among other sub-optimal regions. The gradient search then searches for the best minimum SINR around the best local region determined by the random search. The number of random searches for the code of wireless terminal k is defined as $\hat{n}_{g,k}$. If the best code assignment in the best region has higher minimum SINR than any code assignments within those sub-optimal regions, then the equivalent number of blind searches for wireless terminal k can be written as $$\hat{n}_k = \hat{n}_{r,k}\hat{n}_{g,k}(N+2). \quad (41)$$

Equivalent gradient searches are assumed to be conducted for each of the sub-optimal regions although these gradient searches are actually omitted. Note the factor N+2 in equation (41) represents the number of searches in each step of the gradient search; N searches for the code, and 2 searches for the transmission delay.

With respect to target wireless terminal isolation and sequential packing, if the number of wireless terminals in the system is much less than the dimension of the signal space, it can be assumed that the code search for each wireless terminal is independent. In other words, we assume that the best code found while searching the best codes for wireless terminal k regardless of the codes of other wireless terminal, is also the best code for wireless terminal k when searching the best code assignments for all the wireless terminals. The main purpose of the sequential packing technique described above is to validate this assumption. Therefore, the overall equivalent number of blind searches $\hat{n}$ in the algorithm is roughly given by $$\hat{n} = \prod_{k=1}^{K} \hat{n}_k = \prod_{k=1}^{K} \hat{n}_{r,k}\hat{n}_{g,k}(N+2) \quad (42)$$

The estimation of $\hat{n}$ in equation (42) is over-optimistic; however, it offers some insights into the relationship between the system performance and the algorithm complexity.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention.

We claim:

1. A method for updating spreading codes assigned to wireless terminals in a CDMA wireless communication system, comprising:
   (a) identifying a target wireless terminal having a signal to interference-plus-noise ratio below a predetermined threshold;
   (b) assigning a new spreading code to the target wireless terminal identified in paragraph (a), by searching for an optimal signal signature corresponding to the new spreading code so as to reduce signal interference between the wireless terminals when in reverse link communication with a base station, wherein the act of searching for an optimal signal signature corresponding to the new spreading code comprises selecting a random spreading code out of a set of unused spreading codes associated with a region of signal space that is less dense when compared other regions of signal space;
   (c) forwarding the new spreading code to the target wireless terminal identified in paragraph (a); and
   (d) updating spreading codes assigned to wireless terminals in a CDMA wireless communication system by repeating operational acts specified in paragraphs (a), (b), and (c) on an iterative basis.

2. The method as recited in claim 1, further comprising adjusting a transmission delay of the target wireless terminal identified in paragraph (a).

3. The method as recited in claim 1, further comprising testing the randomly selected code to ascertain whether there is an improvement of the signal to interference-plus-noise ratio for the identified wireless terminal.

4. The method as recited in claim 1, further comprising testing the randomly selected code to ascertain whether there is an improvement of the signal to interference-plus-noise ratio for the identified wireless terminal; and selecting another spreading code in proximity to the set of unused spreading codes associated with a region of signal space that is less dense if there is no improvement in the signal to interference-plus-noise ratio for the identified wireless terminal.

5. The method as recited in claim 1, wherein the searching for an optimal signal signature corresponding to the new spreading code described in paragraph (b) further comprises performing a gradient search for the optimal signal signature.

6. A method for assigning codes to wireless terminals in a CDMA wireless communication system, comprising:
   estimating propagation characteristics of at least one channel used to communicate from at least one of the wireless terminals to a base station in a reverse link of the CDMA wireless communication system;
   assigning spreading codes to the wireless terminals based on the estimated propagation characteristics of the at least one channel, wherein the act of assigning the spreading codes comprises:
   (a) identifying a target wireless terminal having a signal to interference-plus-noise ratio below a predetermined threshold;
   (b) assigning a new spreading code to the target wireless terminal identified in paragraph (a), by searching for an optimal signal signature corresponding to the new spreading code so as to reduce signal interference between the wireless terminals when in reverse link communication, wherein the act of searching for an optimal signal signature corresponding to the new spreading code comprises selecting a random spreading code out of a set of unused spreading codes associated with a region of signal space that is less dense when compared other regions of signal space;
   (c) forwarding, in a forward link of the CDMA wireless communication system, the new spreading code to the target wireless terminal identified in paragraph (a); and
   (d) updating spreading codes assigned to wireless terminals in a CDMA wireless communication system by repeating operational acts specified in paragraphs (a), (b), and (c) on an iterative basis.

7. A system for assigning codes to wireless terminals, the system comprising:
- means for estimating propagation characteristics of at least one channel used to communicate from at least one of the wireless terminals to a base station in a reverse link of the CDMA wireless communication system;
- means for assigning spreading codes to the wireless terminals based on the estimated propagation characteristics of the at least one channel, wherein the act of assigning the spreading codes comprises:
  - (a) means for identifying a target wireless terminal having a signal to interference-plus-noise ratio below a predetermined threshold;
  - (b) means for assigning a new spreading code to the target wireless terminal identified in paragraph (a), by searching for an optimal signal signature corresponding to the new spreading code so as to reduce signal interference between the wireless terminals when in reverse link communication, wherein the act of searching for an optimal signal signature corresponding to the new spreading code comprises selecting a random spreading code out of a set of unused spreading codes associated with a region of signal space that is less dense when compared other regions of signal space;
  - c) means for forwarding, in a forward link of the CDMA wireless communication system, the new spreading code to the target wireless terminal identified in paragraph (a); and
  - (d) means for updating spreading codes assigned to wireless terminals in a CDMA wireless communication system by repeating operational acts specified in paragraphs (a), (b), and (c) on an iterative basis.

8. Apparatus for communicating with a plurality of wireless terminals via a plurality of channels, said apparatus comprising:
- a channel estimator for estimating channel propagation characteristics;
- a code optimizer for assigning spreading codes to the plurality of wireless terminals based on the estimated channel propagation characteristics, wherein the codes are spreading codes; wherein the code optimizer comprises a memory storing computer program instructions; a processor for executing said stored computer program instructions; the computer program instructions defining acts of assigning spreading codes to the plurality of wireless terminals by:
  - (a) identifying a target wireless terminal having a signal to interference-plus-noise ratio below a predetermined threshold;
  - (b) assigning a new spreading code to the target wireless terminal identified in paragraph (a), by searching for an optimal signal signature corresponding to the new spreading code so as to reduce signal interference between the wireless terminals when in reverse link communication, wherein the act of searching for an optimal signal signature corresponding to the new spreading code comprises selecting a random spreading code out of a set of unused spreading codes associated with a region of signal space that is less dense when compared other regions of signal space;
  - (c) forwarding, in a forward link of the CDMA wireless communication system, the new spreading code to the target wireless terminal identified in paragraph (a); and
  - (d) updating spreading codes assigned to wireless terminals in a CDMA wireless communication system by repeating operational acts specified in paragraphs (a), (b), and (c) on an iterative basis for other wireless terminals.

\* \* \* \* \*